US011379230B2

(12) United States Patent
Gou et al.

(10) Patent No.: US 11,379,230 B2
(45) Date of Patent: Jul. 5, 2022

(54) MODULUS CALCULATION THAT LEVERAGES COMPUTER ARCHITECTURE AND/OR OPERAND CLUSTERING

(71) Applicant: LG Electronics Inc., Seoul (KR)

(72) Inventors: Dayin Gou, Santa Clara, CA (US); Harsh Kupwade-Patil, Fremont, CA (US)

(73) Assignee: LG ELECTRONICS, INC., Seoul (KR)

(*) Notice: Subject to any disclaimer, the term of this patent is extended or adjusted under 35 U.S.C. 154(b) by 36 days.

(21) Appl. No.: 17/059,075

(22) PCT Filed: May 30, 2019

(86) PCT No.: PCT/US2019/034571
§ 371 (c)(1),
(2) Date: Nov. 25, 2020

(87) PCT Pub. No.: WO2019/232159
PCT Pub. Date: Dec. 5, 2019

(65) Prior Publication Data
US 2021/0208875 A1 Jul. 8, 2021

Related U.S. Application Data

(60) Provisional application No. 62/678,213, filed on May 30, 2018.

(51) Int. Cl.
*G06F 9/30* (2018.01)
*G06F 7/544* (2006.01)

(52) U.S. Cl.
CPC .......... *G06F 9/3001* (2013.01); *G06F 7/5443* (2013.01)

(58) Field of Classification Search
CPC .............................. G06F 7/5443; G06F 9/3001
See application file for complete search history.

(56) References Cited

U.S. PATENT DOCUMENTS

| 7,966,361 | B1* | 6/2011 | Moni | G06F 7/72 708/491 |
| 2005/0027775 | A1* | 2/2005 | Harrison | G06F 7/535 708/650 |
| 2011/0153701 | A1 | 6/2011 | Moudgill | |
| 2011/0231467 | A1* | 9/2011 | Ahn | G06F 7/728 708/490 |
| 2012/0197956 | A1 | 8/2012 | Fischer | |
| 2015/0339103 | A1 | 11/2015 | Olsen | |
| 2017/0286063 | A1* | 10/2017 | Kaluzhny | G06F 7/729 |

FOREIGN PATENT DOCUMENTS

WO 2009084026 A2 7/2009

* cited by examiner

*Primary Examiner* — Zachary K Huson
(74) *Attorney, Agent, or Firm* — Duane Morris LLP; Philip Woo

(57) ABSTRACT

Modulus operation is performed by a system in an efficient manner taking into account the system's processor and memory architecture. Other features are also provided.

23 Claims, 10 Drawing Sheets

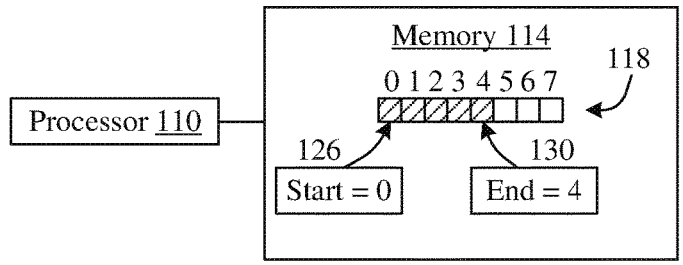
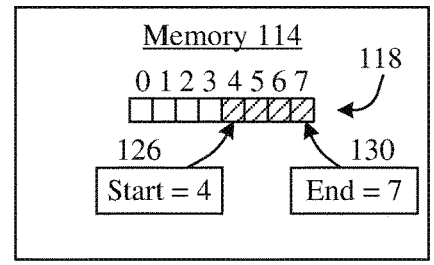
FIG. 1A          FIG. 1B
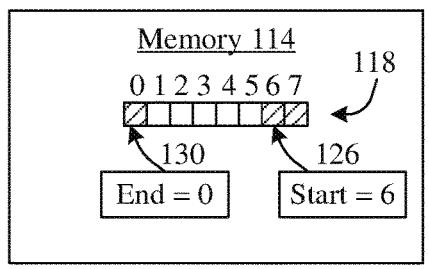
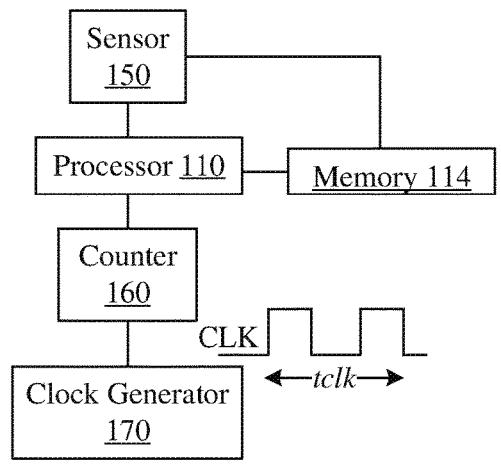
FIG. 1C          FIG. 1D
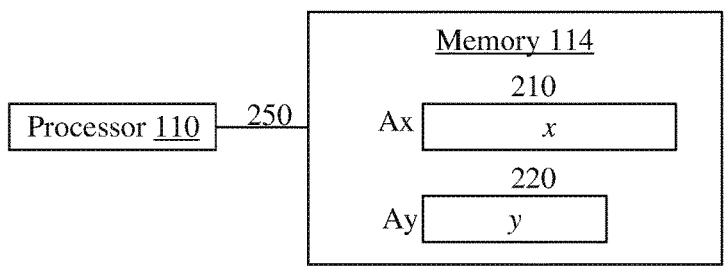
FIG. 2

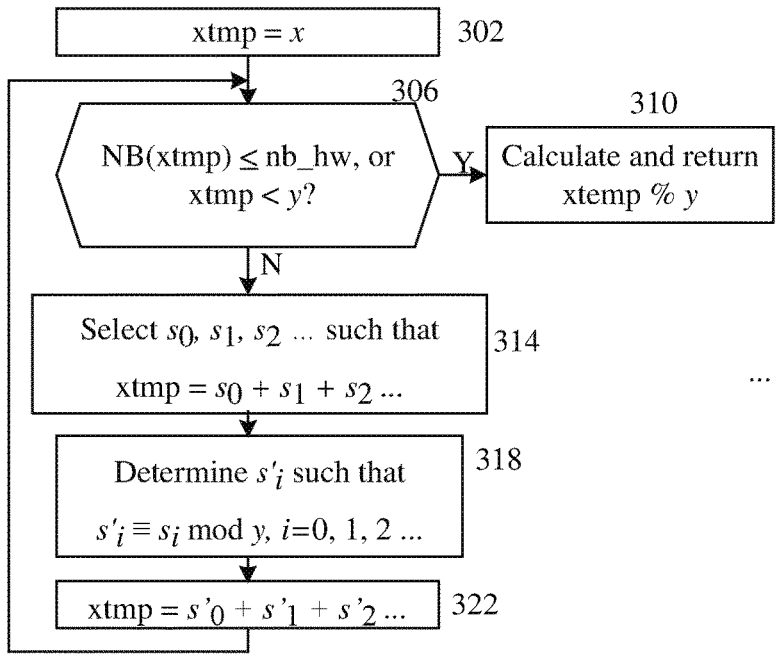
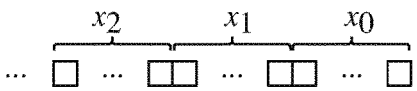
FIG. 3
FIG. 4
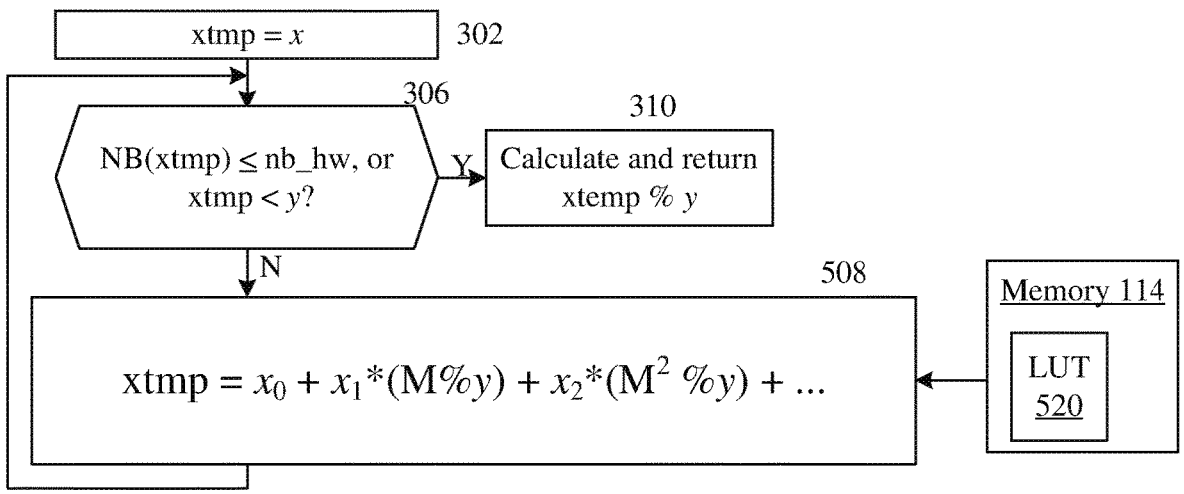
FIG. 5A x =
0x390427943cf6f1e9bed88a99fad660220049ee8dc67a09b0ddda81e47dd43ba798c7bcce6da6cff25c1e9c25b480c50ff7c2f338d3d4
39d39cd118293ccb4e00ddc361077e8d67b2f08fd2e64300b96049e80d5a6744b3a7b1733e841311795909a8d4ffd4479c0a75a34a98
3324e173654c3786f0b45edc5635c3ab70dc6123fc235091f4fb15f43aeb33d43c58fefd89520c087f50d1a7ef0582477b6b7e7e97a015
91d6cb90f1ce4d410496b1d6ee2caa0f8e96f76da01dea2660e74a2340d426750836dcab71fccec755874cfd5af12ff615f066af0e92934
f2915cb2e0bb21fe58704811 64b6a5ae51eadc3d2d0e2c176c50419ce35dfb2628b85176657d y = 0x1fcb2

FIG. 7

$x_0 =$
0xd426750836dcab71fccec755874cfd5af12ff615f066af0e92934f2915cb2e0bb21fe5870481164b6a5ae51eadc3d2d0e2c176c50419ce35dfb2628b8517657d

FIG. 8A

$x_1 =$
0xfc235091f4fb15f43aeb33d43c58fefd89520c087f50d1a7ef0582477b6b7e7e97a01591d6cb90f1ce4d410496b1d6ee2caa0f8e96f76da01dea2660e74a2340

FIG. 8B

$x_2 =$
0xddc361077e8d67b2f08fd2e64300b96049e80d5a6744b3a7b1733e841311795909a8d4ffd4479c0a75a34a983324e173654c3786f0b45edc5635c3ab70dc6123

FIG. 8C

$x_3 =$
0x390427943cf6f1e9bed88a99fad660220049ee8dc67a09b0ddda81e47dd43ba798c7bcce6da6cff25c1e9c25b480c50ff7c2f338d3d439d39cd118293ccb4e00

FIG. 8D

$$x = x_h \cdot M + x_l \quad (1)$$
$$x \% y = (x_h \cdot M + x_l) \% M + x_l) \% y \quad (2)$$
$$x_{new} = x_h \cdot \frac{(M \% y) + (x_l) \% y}{(x_h \cdot M + x_l) \% y} \quad (3)$$

FIG. 11A $$x_{new} = x_h \cdot r_m + r_l \quad (4)$$

FIG. 11B $$x_{new} = x_h \cdot (M \% y) + (x_l) \% y$$

FIG. 11C

$$\begin{array}{r}x_h\phantom{xxx}x_l\\[-2pt]\overline{1111\,110}\end{array}$$

FIG. 11D

$$x_{new} = \begin{array}{r}x_h\phantom{xxx}x_l\\[-2pt]\overline{1111\,110}\end{array} = x_h \cdot M + x_l$$

FIG. 11E

$$\begin{array}{r}x_h\phantom{xxx}x_l\\[-2pt]\overline{1100\,011}\end{array}$$

FIG. 11F

$$x_{new} = \begin{array}{r}x_h\phantom{xxx}x_l\\[-2pt]\overline{100\,010}\end{array} = x_h \cdot M + x_l$$

FIG. 11G

$$x_{new} = \begin{array}{r}x_h\phantom{x}x_l\\[-2pt]\overline{1\phantom{x}110}\end{array} = 14 = x_h \cdot M + x_l$$

FIG. 11H

Example 3  $23 \times 89$ $\phantom{=3\times9=}|3\,2$
$=3\times 9 = \underset{\smile}{2}\;\boxed{7}$ $8\,9|$
$\phantom{=}|3\,2$
$\phantom{==}= \hat{2} + 3\times 8 + 2\times 9 = \underset{\smile}{4}\;\boxed{4}$
$8\,9|$
$|3\,2$
$\phantom{==}= \hat{4} + 2\times 8 = \boxed{20}$
$8\,9|$

FIG. 12

MODULUS CALCULATION THAT LEVERAGES COMPUTER ARCHITECTURE AND/OR OPERAND CLUSTERING

CROSS REFERENCE TO RELATED APPLICATIONS

The present application is a National Stage Application of PCT Application No. PCT/US/2019/034571 filed on May 30, 2019, which claims priority to U.S. Provisional Patent Application No. 62/678,213 filed on 30 May 2018, both of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to methods and apparatus for modulus calculation.

Modulus calculation refers to finding the remainder of division of one number ("dividend" x) by another number ("divisor" y), where both x and y are positive integers. In computer programming languages, x modulus y is conventionally written as x % y.

The modulus operation finds many applications in engineering. One example is circular buffer indexing used in many embedded systems and illustrated in FIG. 1A. The system 104 includes one or more computer processors 110 (we will use the term "processor" to denote a single processor or multiple processors) and a memory 114 that holds a buffer 118. The system acquires data, stores the data in buffer 118, and reads the data from the buffer as needed. For example, buffer 118 can be a receive buffer for network communications. The system receives data from a network medium (e.g. Ethernet or WiFi), and stores the data in buffer 118. A separate computer process, executed by processor 110, reads the data from the buffer and provides it to a suitable application, e.g. email or browser.

Another example is a printer that receives document data for printing, possibly from different computers, and stores the data in buffer 118 as the documents arrive. A separate printer process, executed by processor 110, reads the data from the buffer and sends the data to a printing mechanism.

Buffer 118 can be a fixed size. The terms "size" or "length" are used herein to indicate the number of bits. Fixed sized buffers are often used in embedded systems, e.g. mobile phones or printers. When new data are written into the buffer, the new data must not overwrite the previous data that has not yet been read out. To achieve this objective, the system 104 keeps two pointers: "Start", pointing to where the buffered data begin, and "End", pointing to where the data end. The pointers can be stored in memory 114 for example, at memory locations marked as 126 (Start) and 130 (End), and/or in processor registers (not shown). In FIG. 1A, the Start pointer points to location 0, and the End pointer to location 4; buffer locations 0 through 4 have data that must not be overwritten. As the data are read, the Start pointer is incremented. As new data are written, the End pointer is incremented.

In FIG. 1B, the data occupy locations 4 through 7. The data at locations 0 through 3 have been read, and these locations are available for new data. The locations 5 through 7 have been written with new data after the stage of FIG. 1A.

Subsequent data will be written at location 0, in a circular manner, as shown in FIG. 1C: the occupied locations are 6 through 0 (locations 4 and 5 have been read and are now available for new data).

When data are read or written, the Start or End pointer is incremented, but is re-set to 0 at the buffer end (past location 7). These operations—incrementing and re-setting to zero—can be implemented as a single modulus operation. For example, for the End pointer:

$$\text{End} = (\text{End}+1) \ \% \ \text{BufferLength} \tag{1}$$

where BufferLength=8 (the total number of locations) in the example shown. The Start pointer can be similarly calculated.

Circular buffers are used for data acquired by sensors such as 150 of FIG. 1D, possibly data acquired at a constant frequency. Examples include sensors that provide temperature, pressure, light intensity (e.g. in motion sensors), sound (audio sensors), or other types of data. The data may be written to circular buffer 118 at the End pointer, and read at the Start pointer. The pointers are incremented as described above in connection with equation (1).

Further, as another example, the modulus operation can be used to determine when to trigger data acquisition by a sensor 150 (FIG. 1D). The system may include a counter 160 automatically incremented each clock cycle of a clock signal CLK generated by clock generator 170 and having a time period tclk. The counter may have a fixed number of bits, to count from zero to N−1 with wrap around where N can be any number. Depending on a particular sensor application, the sensor may need to collect data at a constant frequency corresponding to a time period T equal to a certain number n of clock cycles: T=n*tclk. The processor triggers data acquisition by the sensor every time that the counter 160 counts n cycles. If the data acquisition was triggered when the counter value was some number c1, the next data acquisition is initiated when the counter has a value c2 calculated by the processor 110 using the modulus operation as follows:

$$c2 = (c1+n) \ \% \ N$$

Another example application for modulus operation is pseudo random number generation systems, which find many applications in engineering. Such applications include simulation and modeling, e.g. modeling of data flow through a network router. In pseudo-random number generation, a processor 110 may generate a random value, say x, that must be bounded to a certain range, e.g. from 0 to y−1 inclusive. Bounding the value x to such a range can be performed by replacing x with x % y:

$$x = x \ \% \ y \tag{2}$$

Modulus operations are widely used in security systems. Security has been attracting more and more attention in modern systems, and the modulus operation re-assures its importance in non-trivial cryptography, where modulus operations with very large divisors (sometimes, but not always, prime divisors) are very frequent in RSA and Diffie-Hellman (e.g. Elliptic Curve Cryptography (ECC)) type encryption/authentication applications and protocols. In particular, cryptography may involve operations on large numbers, and these numbers may have to be limited to a large but bounded range using a modulus operation such as (2).

Modulus calculation (2) can take a relatively long time to compute on a typical computer processor, considerably longer than other operations, such as, addition or subtraction or even multiplication, especially if the dividend x and the divisor y are very large. An efficient calculation of modulus can be an important part of speeding up the system.

Various techniques currently exist to perform modulus computation.

Trivial Elementary/Middle School Method: The trivial method is a straightforward implementation on a computer of the method taught, for example, in elementary or middle school. In particular, first an integer division is performed to find an integer quotient k:

$$k=x/y$$

Then the remainder r=x % y is obtained by subtraction and multiplication:

$$r=x-k*y$$

The drawback of this method is that division is a very expensive operation in computers, either in software-programmable or hard-wired implementation.

Fermat's Little Theorem and Euler Theorem: Fermat's little theorem and Euler theorem can be utilized to calculate modulus efficiently, but unfortunately they will be mostly used in modular exponentiation where x is expressed as an integer power of an integer.

Montgomery Reduction (see Appendix 3): Montgomery reduction is another frequently used method to calculate modulus without division. However, it involves pre- and post-processing that converts the numbers to Montgomery domain before the calculation and converts back when done. The conversion overhead may be unjustified unless many calculations are performed within the Montgomery domain.

Bit by Bit Based Reduction: Some methods found in literature do the reduction bit by bit to avoid multiplication. See for example Mark A. Will and Ryan K. L. Ko, "Computing Mod Without Mod", Cryptology ePrint Archive: Report 2014/755, Version 20140929:083250 (Sep. 29, 2014), available at https://eprint.iacr.org/2014/755.pdf, incorporated herein by reference. This makes control too complex and consumes too many processor clock cycles either in software programmable or hard-wired implementations.

Limitation on Non-Prime Divisors: Some of the existing methods only work for prime divisors y, and thus are undesirably limited in application.

SUMMARY

This section summarizes some features or embodiments of the invention. Other features or embodiments may be described in the subsequent sections. The invention is defined by the appended claims, which are incorporated into this section by reference.

Some embodiments of the present disclosure provide fast modulus techniques not limited to operands that are prime or integer powers of integers. Further, some embodiments adapt to specific processor/memory architecture. For example, some architectures allow faster instructions for operands having a word or halfword or double-word size and/or operands stored on a word or halfword or double-word boundary. Therefore, some embodiments of the present disclosure are adjusted to perform more computations with operands having such sizes and/or stored on such boundaries.

In some embodiments, the dividend x of the modulus operation is treated as having hierarchical structure, for example as a stream divided into segments which are divided into words which are divided into halfwords. The modulus computation can be performed by reductions from one hierarchical level to another to avoid inefficiencies of bit-by-bit processing. For example, if the dividend x is a stream, the dividend can be split up into segments, and each segment can be "reduced" to a halfword value congruent to the segment modulo y. The halfwords can be appropriately weighted by the segments' weights. More particularly, the dividend x is a weighted sum of the segments, and each segment's weight is determined by the bit positions of the segment in the dividend x (each weight is a power of 2); therefore, the corresponding halfwords are weighted with the same weights and then added to obtain a value congruent to x modulo y. This value is reduced to a halfword, and then the modulus of the halfword is computed to obtain the final result x % y. Other hierarchical operations are possible: for example, each segment can be reduced to a double-word, the double-words can be added with corresponding weights, the sum of the double-words can be further reduced to some other hierarchical level, and so on.

Some embodiments facilitate modulus computations for multiple dividend values x. Each dividend can be associated with a cluster of dividends. For each cluster, a base value $x_B$ is identified, and the modulus ($x_B$ % y) is pre-calculated for the base value. Then for a dividend value x in the cluster, a modulus (|dx|% y) is computed for the absolute value of the difference "dx" between x and the base value $x_B$. The modulus (|dx|% y) is combined with the pre-calculated modulus ($x_B$ % y) to obtain the desired modulus of x. This technique can be fast, especially if x and $x_B$ have many bits in common.

The invention is not limited to the features or advantages described above, but is defined by the appended claims.

BRIEF DESCRIPTION OF THE DRAWINGS

FIGS. 1A, 1B, 1C, 1D illustrate computer systems using a modulus operation.

FIG. 2 illustrates a computer system for performing a modulus operation according to some embodiments of the present disclosure.

FIG. 3 is a flowchart of a modulus method performed by a computer system in some embodiments of the present disclosure.

FIG. 4 illustrates data processing for a modulus method performed by a computer system in some embodiments of the present disclosure.

FIGS. 5A, 5B, 5C, 6 are flowcharts of modulus methods performed by computer systems in some embodiments of the present disclosure.

FIGS. 7, 8A, 8B, 8C, 8D illustrate examples of digital values in modulus methods in computer systems in some embodiments of the present disclosure.

FIGS. 11A, 11B, 11C, 11D, 11E, 11F, 11G, 11H illustrate examples of data representation and processing in modulus computations by computer systems in some embodiments of the present disclosure.

FIG. 12 illustrates an example of multiplication techniques for modulus computations by computer systems in some embodiments of the present disclosure.

DETAILED DESCRIPTION OF SOME EMBODIMENTS

Figure 5B:
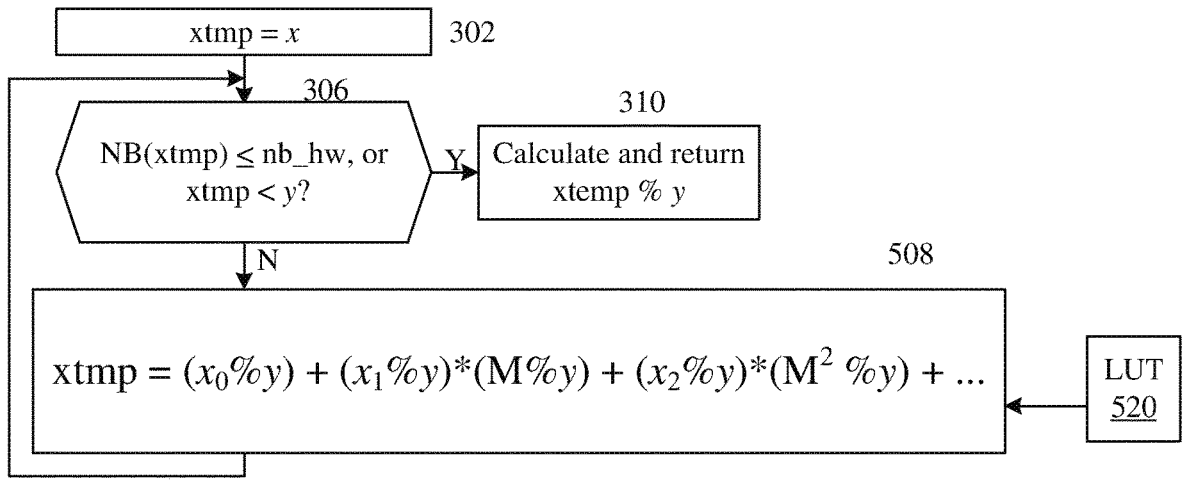

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Some embodiments of the present disclosure provide modulus calculation methods that have the following desirable properties. The methods only use multiplication and addition/subtraction instructions as arithmetic instructions; no division instructions are used. (The term "addition instruction" is used as including subtraction; the term "addition/subtraction" is redundant but is used for clarity.) Division can be implemented by right shift instructions when the divisor is a power of 2, but even right shift instructions are largely avoided for large operands, and are preferably replaced by move instructions. A right shift can be implemented by move instructions if the operand being shifted is stored on a suitably addressable boundary, e.g. a byte boundary, and the shift is by a number of bits divisible by the byte size, or word size, or some other suitable size. If a shift operation cannot be implemented by move instructions, e.g. when the shift is by a number of bits that is not divisible by the byte size, then the shift operation may require bit manipulation within a memory operand. Such bit manipulations can be computationally expensive (i.e. slow and/or requiring additional logic in the processor). Some embodiments of the present disclosure reduce or eliminate the number of shift operations that cannot be implemented by move instructions.

Further, in some embodiments, the bit consumption is faster than in bit-by-bit processing.

Also, in some embodiments, the dividend x is treated as having hierarchical structure, for example as a stream divided into segments which are divided into words which are divided into halfwords. The modulus computation can be performed by reductions from one level to another to avoid inefficiencies of bit-by-bit processing.

Some embodiments can process the dividend x starting either from the most significant bits (MSBs) or the least significant bits (LSBs); and/or different groups of bits can be processed in parallel.

Some embodiments speed up the calculation, e.g., performed by a computer system, by using pre-calculated results.

Some embodiments do not require the divisor y to be a prime number.

The invention is not limited to any of the above advantages or any combination of the above advantages.

Exemplary Computing Systems and Process Flows

FIG. 2 illustrates an exemplary computer system or device 200 for performing a modulus operation according to some embodiments of the present disclosure. As shown in FIG. 2, computer system 200 includes a processor 110 coupled to memory 114. Operation of computer system 200 is controlled by processor 110. And although computer system 200 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computer system 200. Computer system 200 may be implemented as a stand-alone subsystem, as a board added to a computing device, or in some other configuration.

Memory 114 may be used to store software executed by computer system 200 and/or one or more data structures used during operation of computing device 100. Memory 114 may include one or more types of machine readable media, and may or may not be integrated with processor 110 on the same semiconductor chip(s). Some common forms of machine readable media may include floppy disk, flexible disk, hard disk, magnetic disk, CD-ROM, RAM, PROM, EPROM, FLASH-EPROM, and other suitable memory chip or cartridge.

Processor 110 and/or memory 114 may be arranged in any suitable physical arrangement. In some embodiments, processor 110 and/or memory 114 may be implemented on a same board, in a same package (e.g., system-in-package), on a same chip (e.g., system-on-chip), and/or the like. In some embodiments, processor 110 and/or memory 114 may include distributed, virtualized, and/or containerized computing resources. Consistent with such embodiments, processor 110 and/or memory 114 may be located in one or more data centers and/or cloud computing facilities.

In some embodiments, for a modulus operation, the operands x and y are stored in memory 114, in memory areas 210 and 220 respectively, starting at respective addresses Ax and Ay. Memory areas 210 and 220 are aligned to start and/or end at a suitable boundary, e.g. halfword, word, double-word, or some other boundary, depending on the addressing scheme of memory 114, the instruction set and architecture of processor 110, the width of bus 250 interconnecting the processor and the memory, and the length of the x and y operands. For example, in cryptographic applications, the y length can be 256 bits, or 1024 bits, or 2048 bits, or larger. The dividend x can be longer than the divisor y. If memory addresses are byte addresses (usually a byte is an 8-bit structure), then each of values x and y can start on a byte boundary. Also, x and y can be in separately addressed memory devices, so Ax and Ay can be unrelated to each other; for example, Ax can be equal to Ay. Further, the processor 110 architecture is taken into account. In some processors, a particular instruction (such as addition, multiplication, or bit shift) may require the memory operands to start on a particular boundary, e.g. a word or halfword or double-word boundary, or may proceed faster if the operands start on such boundary. Suppose for example that a word size is 64 bits (8 bytes), and the word addresses are divisible by 8. Suppose that the processor requires, or prefers (for high speed, or for low memory access logic complexity), that a memory operand be aligned on a halfword boundary (32 bits, i.e. 4 bytes) for instructions such as additions, subtractions, and multiplications (some embodiments perform the modulus operation using additions, subtractions, and multiplications as the only arithmetic instructions). Then each of Ax and Ay should be divisible by 4. Further, if an instruction operates on a word (64 bits), processor 110 may require the word to be on a word boundary, and each of Ax and Ay may have to be divisible by 8.

Memory 114 and processor 110 are interconnected by a connection 250, which in some embodiments, can be a data bus. The width of the data bus may be a word or doubleword, or some other width, thus enabling a word or doubleword or some other number of bits to be transferred between the memory 114 and the processor 110 simultaneously. In some embodiments, operands are adjusted to have a size divisible by the bus width. For example, a long dividend x can be split into bit groups, $x = < \ldots x_1, x_0 >$ when x is a concatenation of the bit groups $x_i$ ($x_0$ bits are the least significant). Each individual component (bit group) $x_0$, $x_1$, ... has a size suitable for an operand of a processor instruction such as addition or multiplication. Alternatively, each component's size may be an integer multiple of an operand size. Also, all the bits of the component can be transferred between the processor (e.g. the processor's register) and the memory simultaneously. For example, the component size may be equal to or less than the bus width, and may be equal to the size of the processor's register; alternatively, the component size may be larger than, but divisible by, the bus width and/or the register size and/or the operand size.

Thus, in some embodiments, each of memory areas 210, 220 is an integer number of bytes, or halfwords, or words. If the memory areas 210, 220 are not completely filled with the corresponding operands x or y, then the unused most significant bits can be padded with zeros. Either big-endian or little-endian storage system can be used.

For any value v, the notation "NB(v)" will be used to indicate the minimal number of bits in v, and "NBA(v)" to indicate the number of bits in a memory area allocated for v; the memory area can be padded with most significant zeros. For example, in FIG. 2, x has NB(x) bits, but the area 210 (possibly padded) has NBA(x) bits. The value y has NB(y) bits, and the area 220 has NBA(y) bits.

One method for calculating the modulus x % y is as follows. Let M be the lowest power of 2 that is greater than y, i.e.

$$M = 2^m \text{ where } m = NB(y) \qquad (3)$$

Let xl be a number formed by m least significant bits of x, and let xh be the remaining bits of x. Then:

$$x = xh*M + xl \qquad (4)$$

It follows from (4) that:

$$x \% y \equiv xh*(M \% y) + (xl \% y) \qquad (4A)$$

where "≡" denotes congruence modulo y. Clearly, xl % y is either xl (if xl<y) or xl−y (if xl>y).

Further, in view of (3):

$$M \% y = M - y \qquad (4B)$$

Denote:

$$rm = M - y$$

$$rl = xl \% y \qquad (4C)$$

Then the original calculation (x % y) can be reduced to calculating (x_new % y), where:

$$x\_new = xh*rm + rl \qquad (5)$$

Therefore, x % y can be computed iteratively; the value x (or x_new) in each iteration is reduced to the new value x_new until x_new<y.

Alternatively, rl calculation can be delayed until the last iteration, and in each iteration but last the value x_new can be determined as follows:

$$x\_new = xh*rm + xl \qquad (6)$$

In this case, the iterations continue until xh=0. Then the final result x % y is calculated as xl if xl<y, or (xl−y) if xl>y.

Examples of calculations based on (5) and (6) are provided in Appendix 1 at the end of this disclosure.

One way to increase the bit consumption rate in each iteration is to increase the size of M to a value greater than given by (3), i.e. to use m greater than NB(y), while using the rm value in (5) as rm=M % y. In this case, rm is smaller than M-y (cf. equation (4C)), so the bit consumption rate is increased. On the negative side, the calculation of rm=M % y becomes less efficient than (4C), but this disadvantage is ameliorated if rm can be pre-calculated and stored in a look-up table (LUT) for use with different dividends x for the same divisor y.

Further, if M does not have to be restricted to (3), then M can be chosen to have a suitable size for high calculation efficiency, e.g. m can be the length of a word, or doubleword, etc. Of note, in a hierarchical process, the size of M can be different at different hierarchical levels.

The processor instruction operands can be aligned in memory to a suitable boundary such as 8-bit, 16-bit or 32-bit, further improving the computation speed. For example, in equation (4), xh can be calculated as a right shift of x by m bits, and in some processors this operation is inefficient in terms of time or logic required unless x is aligned on a word boundary and m is divisible by a word or byte size to allow the shift to be implemented by move instructions (the word size is 64 bits in exemplary processors, but other word sizes are possible).

Thus, according to some embodiments, m is selected to be greater than the divisor y size, and the value m is selected for efficient computation, except possibly at the lowest hierarchical level. The m value can differ from level to level, and may depend on the dividend at that level (each level may have its own dividend, such as xtmp or $x_i$ that are shown in FIG. 3 and described below), but at each level except possibly the lowest level the m value is independent of the size of the divisor y except that m is at least as large as, and possibly larger than, the size of y. Further, the value m is selected to be divisible by the word size, or halfword size, or some other number of bits suitable for an operand of a processor instruction such as addition, subtraction, multiplication, or move, except possibly at the lowest level. For example, m can be chosen based on a predefined segment size (e.g. 512 bits; $M=2^{512}$), or word size (e.g. 64 bits; $M=2^{64}$), or halfword size (e.g. 32 bits; $M=2^{32}$). The bit shift instructions can be replaced by move instructions to move an operand into the next less significant or next more significant memory location, without bit extraction. There are no cross word boundary bit shifting and re-assembling operations on the one hand except possibly at the lowest level, and bit consumption speed is very fast on the other hand.

To illustrate some advantages, let us assume that each of xh and xl has m bits and rm has r bits, then xh*rm will have r+m bits. Therefore, the 2m-bit value (xh*M+xl) will be reduced in the first iteration to (m+r) bit value xh*rm, i.e. by 2m−(m+r)=m−r bits. The relative bit reduction in each iteration is (m−r)/mr, or (1−r/m)/r. The bit consumption efficiency increases with m, and is high when m is much greater than r. However, when m becomes high, the extra gain becomes smaller and smaller, and selection of m can be determined by other considerations such as available scratch memory size, better cache locality, etc.

FIG. 3 illustrates a flowchart of a method 300, according to some embodiments of the present disclosure, to compute the modulus (x % y) by a computing system (e.g., suitably programmed and/or otherwise configured computer system 200 with processor 110 and memory 114). At step 302, a running dividend value xtmp (in memory 114) is initialized to x. After each iteration, xtmp will remain congruent to x mod y. At step 306, the processor 110 performs a last-iteration test, to check whether at least one of the following two conditions is true: (1) xtmp is no longer than a halfword, i.e. NB(xtmp) does not exceed nb_hw where nb_hw denotes the halfword size in bits (32 bits in the examples above); (2) xtmp is less than y. If any one or both of these conditions are true, then at step 310 the value (xtmp % y) is calculated, possibly in a conventional manner, and returned as the value (x % y). The halfword size in condition (1) is exemplary; some embodiments check for word-size or some other size at which the step 310 could be conveniently performed given the timing and memory requirements, or other requirements, of a particular application.

If test 306 fails (both conditions are false), then the next iteration is performed as follows. The value xtmp is represented as a sum of some positive values $s_i$ (at step 314), preferably having a smaller bit size than xtmp. In some embodiments, $s_i$ is formed by consecutive bits of xtmp as shown at $x_i$ in FIG. 4:

$$xtmp = < \ldots, x_2, x_1, x_0 >$$

$$s_i = x_i * 2^{NLSB(i)} \quad (7)$$

where $x_0$ is the least-significant bits, and NLSB(i) is the number of xtmp bits less significant than $x_i$. In some embodiments, each NLSB(i) is divisible by m. In some embodiments, all $x_i$ have the same size, e.g. m.

At step 318, the processor 110 determines values $s'_i$ such that $s'_i \equiv s_i \mod(y)$. Each $s'_i$ may or may not be the minimal positive value congruent to $s_i$, i.e. $s'_i$ may or may not be equal to $s_i$ % y. But at least some of $s'_i$ will be smaller in length than the corresponding $s_i$. In some embodiments, however, some of the $s_i$ values may be unchanged in at least some iterations, e.g. $s'_0 = s_0$ in at least some iterations.

In some embodiments:

$$s'_i = x_i * (2^{NLSB(i)} \% y) \quad (8)$$

In some embodiments:

$$s'_i = (x_i \% y) * (2^{NLSB(i)} \% y) \quad (9)$$

In (8) and (9), the values ($2^n$ % y) can be pre-calculated and stored in a table (e.g., Look-Up Table, or LUT) for all possible values $$n = NLSB(i)$$

The pre-calculated values can be obtained by the processor from the LUT at step 318.

At step 322, the processor 110 sets xtmp to the sum of $s'_i$, and the processor returns to step 306 for the next iteration.

Significantly, in some embodiments, the number of bits NBA($x_i$) in each $x_i$ is divisible by the halfword length nb_hw or the word length 2*nb_hw (nb_hw=32 in illustrative examples, but other values can be used). Therefore, the LUT needs to store the values ($2^n$ % y) only for the values n divisible by nb_hw. In some embodiments, the values NBA ($x_i$) are divisible by the word length 2*nb_hw, and the LUT stores the values ($2^n$ % y) only for the values n divisible by 2*nb_hw.

In some embodiments, in each iteration, the value NBA (xtmp) is halved. Therefore, the method is more efficient than bit-by-bit processing.

The number of the $s_i$ values may be different in different iterations. There can be any number of $s_i$ values. In some embodiments, in at least some iterations, there are just two $s_i$ values: $s_0$ and $s_1$. In some examples, $s_0$ and $s_1$ can be similar to (4):

$$s_0 = xl; \quad s_1 = xh$$

However, the m value can be higher than in (3). Further, different m values can be chosen in different iterations. Step 318 can be as in (5) or (6).

At step 318, the calculations for different $s'_i$ can be performed in parallel, e.g. by different processors 110, or by different cores within a multi-core processor, possibly by different software threads.

FIG. 5A shows a process 500A which is a variation of process 300 of FIG. 3. In process 500A each s' is calculated as in (8); the step 508 of FIG. 5A represents a combination of steps 314 through 322 of FIG. 3. The values (M % y) can be stored in memory 114 in LUT 520.

FIG. 5B shows another process 500B, which is a variation where each s' is calculated as in (9).

Figure 5C:
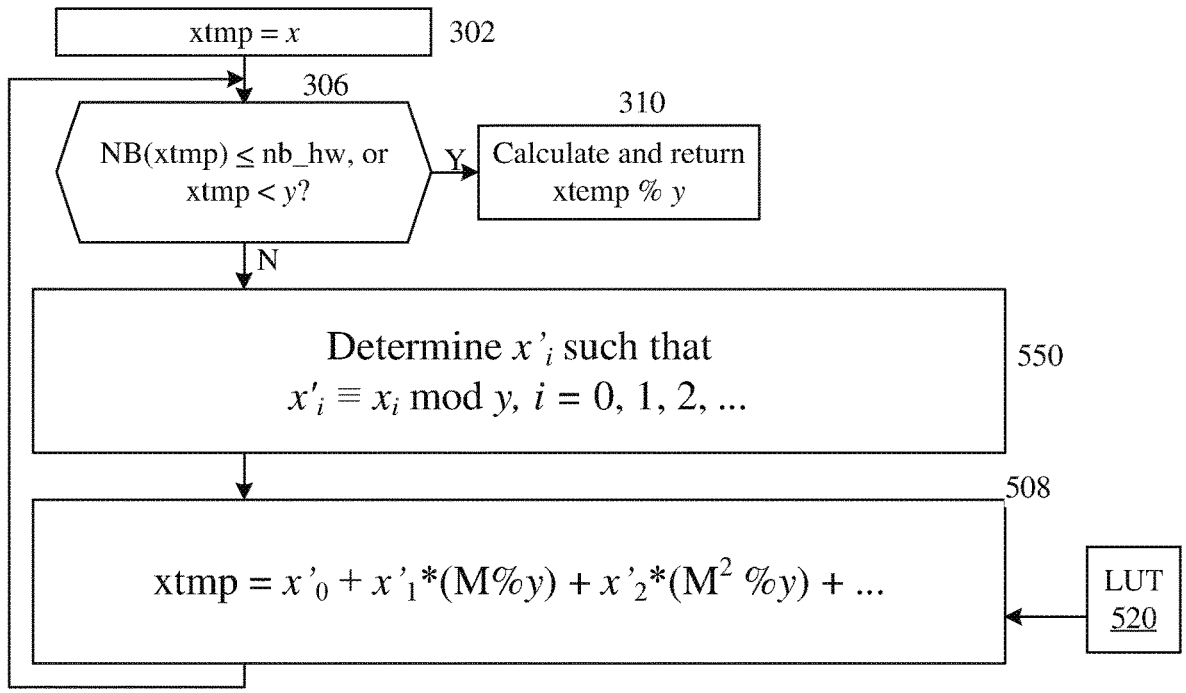

FIG. 5C shows another process 500C, which is a more general variation in which xtmp is computed, at step 508, as the sum of values $s'_i = x'_i * (M \% y)$, where each $x'_i = x_i \mod y$ (step 550), and each $x'_i$ may or may not be as in (8) or (9).

Figure 6:
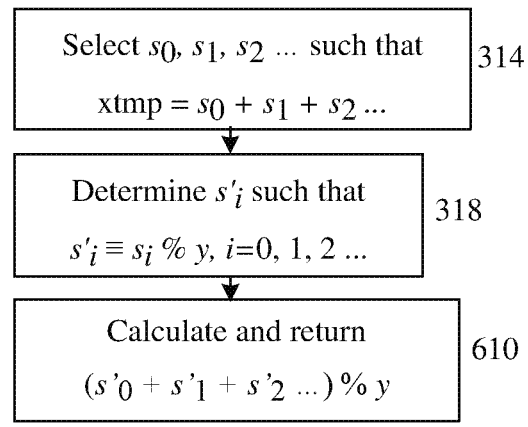

Another modulus process implementation is shown in FIG. 6 as a method 600. At step 314, the value x is represented as the sum of $s_i$, possibly by splitting x into components $s_i$ as in FIG. 4; see equation (7). At step 318, processor 110 calculates the values $s'_i = s_i$ % y, possibly in parallel. Then at step 610, processor 110 calculates the result x % y from the values $s'_i$ as follows:

$$x \% y = (s'_0 + s'_1 + s'_2 \ldots) \% y$$

Step 318 can be performed, for each i, using the method of FIG. 3, 5A, 5B, 5C, or 6, with the dividend being equal to $s_i$. Step 610 can also be performed using the method of FIG. 3, 5A, 5B, 5C, or 6, with the dividend being the sum of $s'_i$.

Hierarchical Look-Up Table (LUT) to Handle Long Dividends

As noted above, the remainders (M % y) can be precomputed and stored in a Look-Up Table (LUT). This may be desirable when the modulus (x % y) should be computed for different dividends x and the same divisor y.

When the x values are long, the LUT storage size becomes a concern. Therefore, some embodiments of the present disclosure use hierarchical LUTs as follows. First, note that FIG. 4 defines x as a polynomial in M with coefficients $x_0$, $x_1$, etc., e.g.:

$$x = x_0 + x_1 * M + x_2 * M^2 + x_3 * M^3 + x_4 * M^4 + x_5 * M^5$$

The dividend x can be represented as a polynomial in $M^3$ as follows:

$$x = (x_0 + x_1 * M + x_2 * M^2) + M^3 * (x_3 + x_4 * M + x_5 * M^2) \quad (10)$$

The coefficients $$p_0 = x_0 + x_1*M + x_2*M^2$$

$$p_1 = x_3 + x_4*M + x_5*M^2$$

can each be reduced to their respective modulus ($p_0$ % y) or ($p_1$ % y) using only the LUT values for $\{M, M^2\}$, i.e. values (M % y) and ($M^2$ % y).

Further, it is clear from (10) that:

$$x = p_0 + p_1*M^3 \quad (11)$$

To speed up the reduction of (11), the LUT should also contain ($M^3$ % y).

More generally, the LUT may include a first layer of the remainders ($M^i$ % y) for the exponents i from 1 to some value k (k=2 in (10)); and a second layer only for the exponents divisible by k+1 (i.e. by 3 in (11)). The LUT does not need remainders for other powers of M. The LUT may contain additional layers formed in a similar manner. For example, the expression (11) may contain additional powers of $M^3$, e.g.:

$$x = p_0 + p_1*M^3 + p_2*M^6 + p_3*M^9 + p_4*M^{12} + \ldots$$

This polynomial can be written as:

$$x = (p_0 + p_1*M^3) + M^6(p_2*M + p_3*M^3) + M^{12}(p_4 + \ldots$$

Then the LUT may contain the remainders for M, $M^2$ (first layer); $M^3$ (second layer); $M^6$, $M^{12}$ (third layer); etc.; but not the remainders for any intervening powers of M (e.g. not for $M^5$).

In some embodiments using multiple LUT layers, the higher layers (i.e. the layers for higher powers of M) can be pre-calculated completely or only partially: some values at the higher layers can be pre-calculated before any modulus is calculated; while other, higher-layer values can be dynamically calculated when they first become needed.

This layering can be very flexible. For example, the dividend x can be treated as a stream of segments (e.g. segments $p_0$, $p_1$ in (11)); each segment as a sequence of words (e.g., x0, $x_1$, . . . ), each word can be represented as halfwords. In some embodiments, the processing of individual segments of the stream can start even before the whole dividend arrives at the processor/memory system. Segments can be processed first-in-first-served. As a new segment arrives, it is processed, and the result is combined with the results for the previous segments. The stream can arrive with either LSBs or MSBs first.

Suppose for example the dividend x is of the form:

$$x = x_2*M*M + x_1*M + x_0 \quad (12)$$

Then x % y can be calculated as:

$$x \% y = (((x_2*M + x_1) \% y)*M + x_0) \% y \quad (13)$$

When $x_2$ and $x_1$ arrive, the first value ($x_2*M + x_1$) % y can be calculated. Then $x_0$ arrives, and is added to the first value, and their sum is used as a dividend to calculate the final result as in equation (13).

One can also use map-and-reduce style parallelization: Assume x is as in equation (12). Then denote $p_2 = (x_2*M*M)$ % y, $p_1 = (x_1*M)$ % y, $p_0 = x_0$ % y. The monomial values $p_2$, $p_1$, $p_0$ can be calculated in parallel, then combined together by calculating ($p_2 + p_1 + p_0$) % y. This is illustrated in FIG. 6; each $p_1 = s'_i$.

Example: Stream, Segment, Word, and Halfword

Some embodiments will now be illustrated on the example values of FIG. 7, where x is 2048-bit value, and y is a 17-bit value (the prefix "0x" in FIG. 7 indicates that the value is given in hexadecimal notation, the prefix is not part of the value).

Assume a segment is 512 bits. The dividend x can be divided into 4 segments $x_3$, $x_2$, $x_1$, $x_0$ as shown in FIGS. 8A through 8D.

Assume a word is 64 bits. Then each segment will be divided into 8 words.

Each word is defined as 2 halfwords. A halfword is 32 bits.

The reduction can be performed by any of the methods or processes, for example, as shown and described with reference to FIG. 3, 5A, 5B, 5C, or 6.

Example: Reduction of Operand in a Halfword

Turning to FIGS. 3, 5A, 5B, 5C, step 310 can be performed using the process of Table 1 below when xtmp has been reduced to a halfword size or less. The divisor y fits in a halfword (NB(y)≤32 in FIG. 7). Table 1 illustrates an implementation of step 310 in Python script (Python is a programming language). The M value can be chosen as in equation (3); the value (M−y) is denoted as "r" in Table 1 (see line 4 in Table 1). The process of Table 1 can be relatively slow due to bit shift operations and low bit consumption at each iteration. However, in some embodiments, step 310 is performed only once, and the dividend xtmp is short in this step. (However, the script of Table 1 can be used for any dividend sizes.) In Table 1, the line numbers in the left column are not part of the script.

TABLE 1

Reduction of Halfword

| Line no. | Script |
| --- | --- |
| 1 | # return rem: x % y (i.e. remainder) |
| 2 | def reduce_halfword(x,y) : |
| 3 | nb_y = len(bin(y)) − 2 |
| 4 | r = (1 << nb_y) − y |
| 5 | mask = (1 << nb_y) − 1 |
| 6 | cond = True |
| 7 | xtmp = x |
| 8 | while cond : |
| 9 | xh = xtmp >> nb_y |
| 10 | xl = xtmp & mask |
| 11 | xtmp = xh * r + xl |
| 12 | cond = (xh != 0) |
| 13 | rem = xtmp if xtmp < y else xtmp -y |
| 14 | return rem |

In line 3, the variable nb_y is set to the length of y: nb_y=NB(y). Subtraction of 2 is performed because Python appends the prefix "0b" when evaluating "bin(y)".

The bit shifts in lines 5 and 9 can be slow.

For example: if x=0x8517657d (the least significant halfword in FIG. 7), and y=0x1fcb2 (as in FIG. 7), then the method of Table 1 will give x % y=48041 decimal.

Example: Reduction of Word

Table 2 below provides Python script for one embodiment of reduction of a word dividend. This embodiment is similar to Table 1, but in Table 2 the value m is equal to the halfword size nb_hw. Therefore, the bit shifts (line 9 of Tables 1 and 2) are faster in Table 2, and do not need a bit shift instruction but can be executed as memory moves—each halfword is moved to the next less-significant halfword.

The method of Table 2 can be used for dividends larger than a word, but in some embodiments the method is performed only after the dividend has been reduced to a word.

The output of the Table 2 method is a value "rem" of a halfword size. Then the method of Table 1 can be performed to compute rem % y, which is equal to x % y.

Reduction of word is very fast if the bit length of halfword is much longer than the bit length of y.

TABLE 2

Reduction of Word

| Line No. | Script |
|---|---|
| 1 | # return rem: rem is congruent to x % y (mod y), but rem bit length is nb_hw |
| 2 | def reduce_word(x, y, nb_hw) : |
| 3 |     r = (1 << nb_hw) % y  # mimic mod_halfword( ) |
| 4 |     mask = (1 << nb_hw) − 1 |
| 5 |     cond = True |
| 6 |     xtmp = x |
| 7 |     # cnt = 0 |
| 8 |     while cond : |
| 9 |         xh = xtmp >> nb_hw |
| 10 |         xl = xtmp & mask |
| 11 |         xtmp = xh * r + xl |
| 12 |         cond = (xh != 0) |
| 13 |         # print "cnt: ", cnt |
| 14 |         # cnt = cnt + 1 |
| 15 |     rem = xtmp |
| 16 |     return rem |

For example: if x=0xdfb2628b8517657d (the least significant word in FIG. 7), and y=0x1fcb2 (as in FIG. 7), then the method of Table 2 will generate the x % y as 1554080925 (decimal).

Example: Reduction of Segment

Reduction of segment in Table 3 below can be as in FIG. 5A, 5B, 5C, or 6. For example, x can be represented as:

$$x = x_2 * M * M + x_1 * M + x_0$$

where $M = 2^{nb\_wd}$, where nb_hw=2*nb_hw is the word length. The values (M % y) and (M*M % y) can be pre-calculated and stored in the LUT. These values are called "weights" because the sum "xtmp" at step 508 in FIG. 5A, 5B, or 5C can be viewed as a weighted sum with weights (1% y), (M % y), ($M^2$% y), etc.

The output of the Table 3 method is a value "rem" of a halfword size. Then the method of Table 1 can be performed to compute rem % y as the final result of x % y.

TABLE 3

Reduction of Segment

| Line No. | Script |
|---|---|
| 1 | # return rem: rem is congruent to x % y (mod y), but rem bit length is nb_hw) |
| 2 | def reduce_segment(x, y, nb_hw) : |
| 3 |     # break x into words |
| 4 |     x_wd = [ ] |
| 5 |     mask = ( 1 << (2*nb_hw) ) − 1 |
| 6 |     x_tmp = x |
| 7 |     while x_tmp : |
| 8 |         x_wd.append(x_tmp & mask) |
| 9 |         x_tmp = x_tmp >> (2*nb_hw) |
| 10 |     wd_r1 = [ reduce_word(el, y, nb_hw) for el in x_wd ] |
| 11 |     wt = [ ( 1 << (el * (2*nb_hw))) % y for el in range(0, len(x_wd)) ] |
| 12 |     wd_r2 = [ (v1*v2) for (v1, v2) in zip(wd_r1, wt) ] |
| 13 |     wd_sum = sum(wd_r2) |
| 14 |     rem = reduce_word(wd_sum, y, nb_hw) |
| 15 |     return rem |

In this method, the array x_wd [ ] is an array of the $x_i$ values where each $x_i$ has the word length "2*nb_hw" (two halfwords). In line 4, the array is initialized to an empty value. Then the array is populated in the loop at lines 7-9, starting with the least significant bits of x.

In line 10, each word in the array x_wd is reduced to a halfword by calling the method "reduce_word" of Table 2. Of note, these reductions can be done in parallel for different words. This can be viewed a variation of step 550 in FIG. 5C.

In line 11, the array of weights is created. In this illustrative embodiment, they weights are not pre-calculated but are computed at line 11. In other embodiments, the weights can be pre-calculated and obtained from LUT 520.

In line 12, the array of values $x_i * w_i$ is created, where $w_i$ is the corresponding weight, i.e. $w_i = (M^{i-1} \% y)$. Note step 508 in FIG. 5C.

In line 13, the weighted values are summed up as in step 508 of FIG. 5A, 5B, or 5C.

In line 14, the sum is reduced by calling the "reduce_word" method of Table 2.

For example, if $x=x_0$ as in FIG. 8A, and y=0x1fcb2 as in FIG. 7, then the method of Table 3 will generate the result rem=91549 (decimal).

Example: Reduction of Stream

Reduction of a stream—see Table 4 below—is similar to reduction of a segment (Table 3). The only difference is that the weights are based on segment length instead of word length, i.e. $M=2^{nb\_sg}$ where nb_sg is segment length.

The output of the Table 4 method has a halfword length. The Table 1 method can then be performed to get final result.

Figure 9:
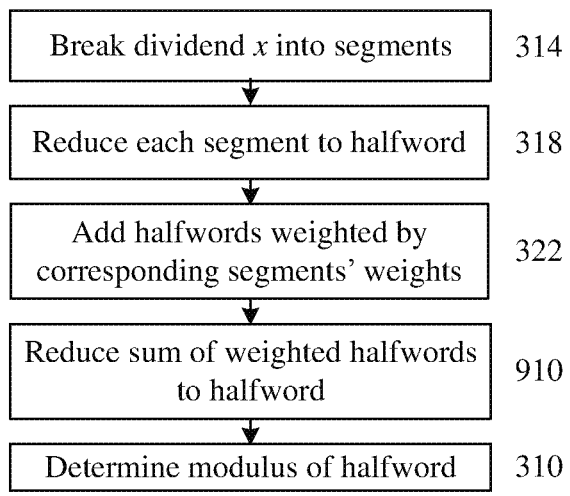
FIGS. 9 and 10 are flowcharts of modulus methods performed by computer systems in some embodiments of the present disclosure.

This method is also illustrated in FIG. 9.

TABLE 4

Reduction of Stream

| Line No. | Script |
|---|---|
| 1 | # return rem: rem %y (congruent to x % y, but rem bit length is nb_hw) |
| 2 | def reduce_stream(x, y, nb_sg, nb_hw) : |
| 3 |     # break x into segments; step 314 in FIG. 9 |
| 4 |     x_sg = [ ] |
| 5 |     mask = ( 1 << nb_sg ) − 1 |
| 6 |     x_tmp = x |
| 7 |     while x_tmp : |
| 8 |         x_sg.append(x_tmp & mask) |
| 9 |         x_tmp = x_tmp >> nb_sg |
|  |     # reduce each segment to halfword - step 318 in FIG. 9 |
| 10 |     sg_r1 = [ reduce_segment(el, y, nb_hw) for el in x_sg ] |
|  |     # determine segments' weights, and add halfwords weighted by corresponding weights; see step 322 in FIG. 9 |
| 11 |     wt = [ ( 1 << (el * nb_sg)) % y for el in range(0, len(x_sg)) ] |

TABLE 4-continued

Reduction of Stream

| Line No. | Script |
|---|---|
| 12 | sg_r2 = [ (v1*v2) for (v1, v2) in zip(sg_r1, wt) ] |
| 13 | sg_sum = sum(sg_r2) |
| | # reduce sum of weighted halfwords to halfword - step 910 in FIG. 9 |
| 14 | rem = reduce_word(sg_sum, y, nb_hw) |
| 15 | return rem # then rem % y can be computed as in Table 1 |

For example, with x and y as in FIG. 7, the method of Table 4 generates the remainder of 86654245. The final result, after reduction of halfword as in Table 1 (step 310 in FIG. 9), will be 53955.

Exemplary Weight Values:

As noted above, in many applications, the modulus is calculated for multiple dividend values for the same divisor y, but the weights can be calculated only once (e.g. off-line or at initialization) and saved in LUT 520. Suppose for example that y is as in FIG. 7, a halfword is 32 bits, and a segment is 512 bits. Then the word weights (wt in Table 3) and the segment weights (wt in Table 4) are as follows (the suffix "L" below is not part of the weight value, but simply indicates in Python that the value is to be stored as a double-word):

word weights: ['0x1L', '0x1b16eL', '0x1b46cL', '0x10986L', '0x15fdcL', '0x108b0L', '0xb474L', '0x1d658L']

segment weights: ['0x1L', '0x14c50L', '0xffb4L', '0x15b4cL', '0xd800L', '0x1cbecL', '0xadcaL', '0x17342L']

Differential Calculation: Clusters

In some applications, the different dividend values x may have some similarity. For example, each x value may come from the same data structure, and only some fields may be different. Even those fields may be similar. In this case, a remainder can be pre-calculated for some value $x_B$ and stored in a memory. Then the remainders x % y can be calculated in real time differentially, by calculating (dx=x−$x_B$) and (dx % y) in real time and adding (dx % y) to the pre-calculated value ($x_B$ % y):

$$x \% y = ((x_B \% y) + (dx \% y)) \% y \qquad (14A)$$

This is possible because (x+dx) % y is congruent to x % y+dx % y. The value dx % y can be calculated fast if dx has many zero bits.

The equation (14A) assumes that x≥$x_B$, i.e. dx is non-negative. For example, $x_B$ can be the smallest value in the cluster. But if not, i.e. dx is negative, then the following computation can be used instead of (14A):

$$x \% y = ((x_B \% y) - ((-dx) \% y)) \% y \qquad (14B)$$

Each of equations (14A), (14B) can be replaced by:

$$x \% y = ((x_B \% y) + dx) \% y \qquad (15)$$

Figure 10:
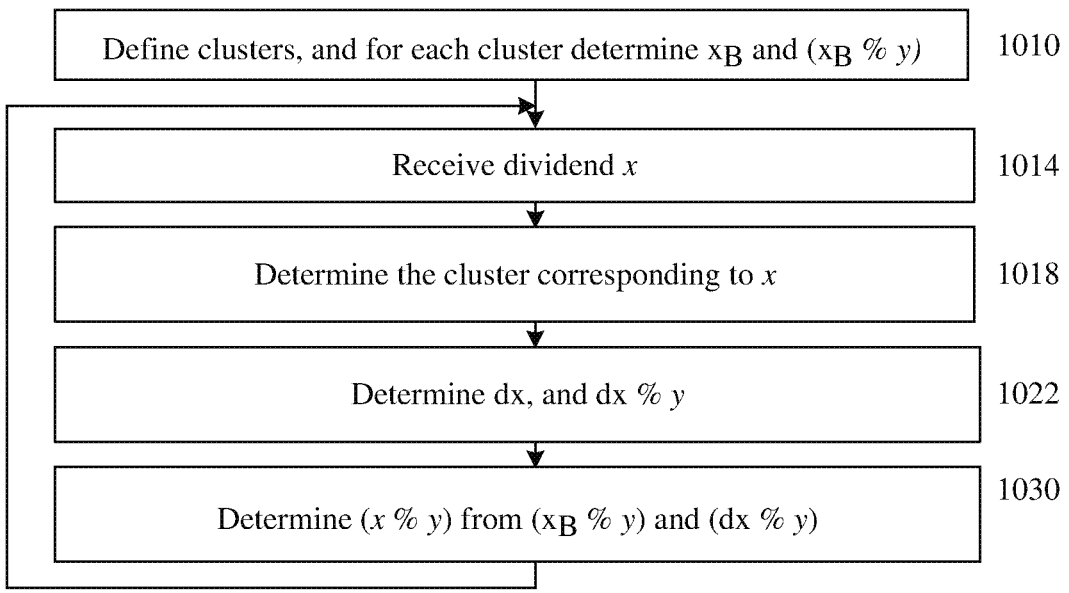

When a large amount of input data is collected (for example after a dividend collection device is deployed and put into operation), the distribution of different values of x can be analyzed (offline) to discover the cluster structure in the input data. Based on trade-off consideration, a few typical clusters will be identified, each cluster's value $x_B$ can be determined, and the remainder $x_B$ % y can be calculated and saved in a memory. See step 1010 in FIG. 10. When a new input value x comes in (step 1014), a low-cost light-weight classification can be performed to identify the cluster to which the new value belongs (step 1018), and the reduction (14A) or (14B) or (15) can be calculated dynamically (in real time) for the corresponding $x_B$ value (steps 1022, 1030). The offline analysis (step 1010) can be performed by the same system as the reductions (steps 1014 through 1030), or by different computer system(s).

As an example, the similarity can be defined as a number of equal bit values at the same bit location. This analysis and similarity can be done at word or segment level (the input data can be cut into words/segments, all words/segments can be pooled together to do cluster analysis; thus, a cluster can be defined as a set of word values, or segment values, or at some other granularity).

Some embodiments of the present invention are defined by the following clauses.

Clause 1 defines a method comprising:

performing a first modulus operation by a system having a processor whose instruction set includes an instruction subset having one or more addition instructions and one or more multiplication instructions, wherein each instruction in the subset accepts an operand of a first size greater than one bit;

wherein the first modulus operation has a dividend x and a divisor y;

wherein performing the first modulus operation comprises:

(1) obtaining, by the system, first components xi of the dividend x, each first component xi representing a sequence of consecutive bits of the dividend, each first component xi occupying, in a computer storage, a number of bits which is divisible by the first size, the dividend being equal to a sum of first monomials such that each first monomial is a product of a corresponding first component and a corresponding power $M1^i$ of a value $M1=2^{\alpha 1}$ where $\alpha 1$ is an integer greater than one and is divisible by the first size, wherein in at least one corresponding power $M1^i$, an exponent i is positive;

(2) for a set of one or more first monomials whose exponents are positive, obtaining by the processor, for each first monomial $M1^i$ in the set, a modulus ($M1^i$ % y);

(3) for each first monomial, multiplying, by the processor, a corresponding first multiplicand by a corresponding second multiplicand to obtain a corresponding product, wherein:

the corresponding first multiplicand is either the corresponding first component xi or the modulus (xi % y);

the corresponding second multiplicand is either the corresponding power $M1^i$ or the modulus ($M1^i$ % y);

wherein for at least one first monomial, the corresponding second multiplicand is the modulus ($M1^i$ % y);

(4) obtaining, by the processor, a sum of the corresponding products; and (5) calculating the modulus (x % y) by the processor by using the sum of the corresponding products as a dividend instead of x.

2. The method of clause 1 wherein in operation (3), the corresponding products for at least two components are calculated in parallel by the processor.

3. The method of clause 1 or 2, wherein in operation (3), for a set of one or more first monomials, the corresponding first multiplicand is the modulus (xi % y);

wherein for each first monomial in said set of one or more first monomials:

the corresponding first component xi is a concatenation of corresponding second components xij, each second component xij representing a sequence of consecutive bits of the corresponding first component xi, each second component xij occupying, in a computer storage, a number of bits which is divisible by the first size, the corresponding first component being equal to a sum of second monomials such that each second monomial is a product of a corresponding second component and a corresponding power $M2^i$ of a value $M2=2^{\beta 1}$ where $\beta 1$ is an integer greater than one and is divisible by the first size, and $M1=M2^k$ where $k=\alpha 1/\beta 1$ is an integer greater than 1, and wherein in at least one corresponding power $M2^i$, an exponent i is positive;

in operation (5), calculating the modulus (xi % y) comprises performing operations (2), (3) and (4) with:
  the dividend x being replaced by xi;
  M1 being replaced by M2.

4. The method of clause 3, wherein for each first monomial in said set of one or more first monomials, a number of the corresponding second components is smaller than or equal to k.

5. The method of clause 3 or 4, further comprising:
  storing, in a computer storage, pre-calculated remainders $(M1^i \% y)$ and $(M2^j \% y)$ for j from 1 to k−1 inclusive, and for i from 1 to a predefined value inclusive, but not for any j being greater than or equal to k except if $(M2^j \% y)=(M1^i \% y)$ for some i;
  in at least one instance of operation (3), obtaining the second multiplicand as a pre-calculated value from the computer storage.

6. The method of any preceding clause, wherein in operation (1), said obtaining each first component comprises storing the first component in an addressable memory of the computer storage beginning at an address boundary providing a fastest possible execution of instructions of the instruction subset in obtaining the corresponding first multiplicand and performing the corresponding multiplying in operation (3).

7. The method of any preceding clause, wherein in operation (3), each second multiplicand is stored in an addressable memory at an address boundary providing a fastest possible execution of instructions of the instruction subset in performing the corresponding multiplying.

8. The method of any preceding clause, wherein said multiplying is performed by a Comba method or a Karatsuba method.

9. A method comprising:
  performing a first modulus operation by a system having a processor whose instruction set includes an instruction subset having one or more addition instructions and one or more multiplication instructions, wherein each instruction in the subset accepts an operand of a first size greater than one bit;
  wherein performing the first modulus operation comprises:
    obtaining, by the processor, a dividend x for the first modulus operation, and a divisor y for the first modulus operation, each of the dividend x and the divisor y being represented in a memory by a number of bits divisible by the first size;
    determining, by the processor, a value xtmp equal to one of:

$xh^*(M \% y)+xl$ $xh^*(M \% y)+(xl \% y)$ where:
    xl is m least significant bits of x, where m is greater than the first size and is divisible by the first size,
    $M=2^m$,
    xh is all the bits of m other than xl;
    calculating the modulus by the processor from the value xtmp, the modulus being calculated as a value xtmp % y.

10. The method of clause 9, wherein calculating the modulus from the value xtmp comprises repeating the method with the value xtmp instead of x.

11. The method of clause 9 or 10, wherein in performing the first modulus operation, at least one of the values x, y, xtmp, xh, xl, and M is stored in said memory beginning at an address boundary providing a fastest possible execution of instructions of the instruction subset in performing the first modulus operation.

12. The method of clause 9, 10, or 11, wherein in performing the first modulus operation, each of the values x, y, xtmp, xh, xl, and M is stored in said memory beginning at an address boundary providing a fastest possible execution of instructions of the instruction subset in performing the first modulus operation.

13. The method of any one of clauses 9 through 12, wherein determining the value xtmp comprises performing multiplication $xh^*(M \% y)$ by a Comba method or a Karatsuba method.

14. A method comprising:
  performing a modulus operation by a system having a processor whose instruction set includes an instruction subset having one or more addition instructions and one or more multiplication instructions, wherein each instruction in the subset accepts an operand of a first size greater than one bit;
  wherein performing the modulus operation comprises:
    obtaining a dividend in a computer storage;
    obtaining a divisor in the computer storage;
    performing a process that obtains, from the dividend, a unit consisting of a plurality of consecutive bits of a first value congruent to the dividend modulo the divisor, the unit not including a number w of least significant bits of the first value, wherein w is divisible by the first size, and w is greater than a size of the divisor but the unit is otherwise independent of the size of the divisor in that the process provides the same unit for any divisor of a size less than w;
    determining, by the processor, a weight value for the unit, the weight value being congruent to $2^w$ modulo the divisor and having a size smaller than w+1; and
    combining, by the processor, the weight value with the unit to determine a remainder of division of the dividend by the divisor.

15. The method of clause 14 wherein said combining comprises:
  multiplying the unit by the weight value to obtain a weighted value; and
  using the weighted value to determine the remainder of division of the dividend by the divisor.

16. The method of clause 14 or 15, wherein the weight value is equal to a remainder of division of $2^w$ by the divisor.

17. The method of clause 14, 15, or 16, wherein in performing the first modulus operation, at least one of the dividend, divisor, the unit, the first value, and the weight, is stored in an addressable memory beginning at an address boundary providing a fastest possible execution of instructions of the instruction subset in performing the first modulus operation.

18. The method of clause 14, 15, 16, or 17, wherein in performing the first modulus operation, each of the dividend, divisor, the unit, the first value, and the weight, is stored in an addressable memory beginning at an address boundary providing a fastest possible execution of instructions of the instruction subset in performing the first modulus operation.

19. The method of clauses 14 through 18, wherein said multiplying is performed by a Comba method or a Karatsuba method.

20. A method for performing modulus operations for dividends x by a processor, the method comprising:

storing, in a computer memory, a remainder ($x_B$ % y) for each of one or more values $x_B$, wherein y is a divisor for each said modulus operation;

receiving dividends x by the processor;

for each dividend x, performing the corresponding one of said modulus operations, wherein performing each corresponding modulus operation comprises:

calculating, by the processor, a difference between the dividend x and a corresponding one of said one or more values $x_B$; and calculating, by the processor, a result of the corresponding modulus operation from the corresponding remainder ($x_B$ % y) and said difference.

21. The method of clause 20, wherein calculating the result of the corresponding modulus operation comprises:

calculating, by the processor, a remainder of division of said difference by the divisor y; and calculating, by the processor, a result of the corresponding modulus operation from the remainder ($x_B$ % y) and said remainder of division of said difference by the divisor y.

22. The method of clause 20 or 21, wherein in performing each said modulus operation, at least one of the corresponding dividend x, the divisor y, and the corresponding value $x_B$ is stored in the computer memory beginning at an address boundary providing a fastest possible execution of instructions of the instruction subset in performing the modulus operation.

23. The method of clause 20, 21, or 22, wherein in performing each said modulus operation, each of the corresponding dividend x, the divisor y, and the corresponding value $x_B$ is stored in the computer memory beginning at an address boundary providing a fastest possible execution of instructions of the instruction subset in performing the modulus operation.

24. A method comprising:

performing a first modulus operation x % y by a system having a processor and a computer storage, wherein x is a dividend and y is a divisor;

wherein performing the modulus operation comprises performing, by the system, a plurality of intermediate operations one of which provides the modulus x % y, each intermediate operation comprising:

(1) obtaining, by the system, first components xi of a first dividend corresponding to the intermediate operation, the first dividend being equal to x or being smaller than x but congruent to x modulo y, each first component xi representing a sequence of consecutive bits of the first dividend, wherein one or more first components are greater than or equal to the divisor y;

(2) for each first component xi greater than or equal to the divisor y, calculating by the processor, using at least one multiplication instruction in the processor's instruction set, a first product pi, where:

$pi = xi' * ri$ xi' is at most xi and is congruent to xi modulo y;

$ri = 2^{NLSB(i)}$ % y; and

NLSB(i) is a number of bits of the first dividend that are less significant than xi;

wherein in at least one intermediate operation, for at least one first component xi, the corresponding value $2^{NLSB(i)}$ is at least two times greater than the divisor y;

wherein in at least one intermediate operation, for at least one first component xi, the corresponding value $2^{NLSB(i)}$ is greater than the divisor y but less than 2*y.

25. The method of clause 24, wherein:

an instruction set of the processor includes an instruction subset having one or more addition instructions and one or more multiplication instructions, wherein each instruction in the subset accepts an operand of a first size greater than one bit;

for each first component such that $2^{NLSB(i)}$ is at least two times greater than the divisor y, the value NLSB(i) is divisible by the first size;

a size of the divisor y is less than the first size.

26. The method of clause 24, wherein:

an instruction set of the processor includes an instruction subset having one or more addition instructions and one or more multiplication instructions, wherein each instruction in the subset accepts an operand of a first size greater than one bit;

for each first component such that $2^{NLSB(i)}$ is at least two times greater than the divisor y, the value NLSB(i) is divisible by the first size;

for at least one first component such that $2^{NLSB(i)}$ is greater than the divisor y but less that 2*y, the value NLSB(i) is not divisible by the first size.

27. A method of any preceding clause, wherein the modulus operation is performed to update a pointer to a circular buffer.

28. A method of any preceding clause, wherein the modulus operation is performed to generate a pseud-random number for simulation or modeling of an industrial process.

29. A method of any preceding clause, wherein the modulus operation is performed on a cryptographic value in a cryptographic process.

30. A system comprising a processor configured to perform a method of any preceding clause.

31. A computer readable medium comprising computer instructions configuring the processor to perform a method of any preceding clause.

The embodiments described above do not limit the invention. Further, the invention is not limited to a particular implementation. The methods can be implemented either in software-programmable processor 110, or can be hardwired, or in a mixed configuration, such a partially software-programmable and partially hardwired (dedicated) processor. Multiplication operations can be performed as in Appendix 2 below or in some other way. The invention is defined by the appended claims.

APPENDIX 1

Fast Method of Calculating Modulus with Very Large Numbers

Let (x, y)∈Z

Let us assume $M=2^m$ is the least number which is greater than y. Then x can be expressed as shown in FIG. 11A, where:

$x_i$ % y will be
either $x_i$ (if $x_i < y$)
or $x_i - y$ (if $x_i > y$)
M % y = M−y (because M>y)
Assume $r_m = M - y$
$r_i = x_i$ % y
Equation (2) of FIG. 11A can be re-written as shown in FIG. 11B.

As an alternative, if we delay $r_l$, $$x_{new}=x_h*r_m+x_l$$

Loop till $x_{new}<y$. If $x_{new}<y$ then $x_{new}=x \% y$
Remark 1 If $r_m$ is very close to M, then the bit consumption speed will be very slow
Let M=256 and y=3 and $r_m$=253
Let x be 16 bit and $x_h$ be 8 bit. Then $x_h*r_m$ is still 16 bit.
Problem Compute 254% 5
Step 1: Pre-Processing
x=254 and y=5
x=254=11111110
y=5=101
$M=2^m=2^3=8$ (where m=3) (Compute $M=2^m$ such that M is the least number which is greater than y (=5 in this case)),
$r_m$=M−y=8−5=3
Compute $x_{new}$ as in FIG. 11C, where $r_m$=M−y since M>y
Step 2: Iteration 1
Since $r_m$ is 3, see FIG. 11D.
$x_h$=11111=31
$x_l$=110=6
$r_l=x_l \% y=6 \% 5=6-5=1$
$x_{new}=x_h*r_m+r_l=31*3+1=94=1011110$
Is $x_{new}<y$ (No)
Step 2 Delayed $r_l$: Iteration 1
Since $r_m$ is 3, see FIG. 11D.
$x_h$=11111=31
$x_l$=110=6
$r_l=x_l \% y=6 \% 5=6-5=1$
$x_{new}=x_h*r_m+r_l=31*3+1=94=1011110$
Is $x_{new}<y$ (No)
Step 3: Iteration 2
Find $x_h$ and $x_l$ such that $x_{new}$ is as in FIG. 11E.
$x_h$=1011=11
$x_l$=110=6
$r_l=x_l \% y=6 \% 5=6-5=1$
$x_{new}=x_h*r_m+r_l=11*3+1=34=100010$
Is $x_{new}<y$ (No)
Step 3 Delayed $r_1$: Iteration 2
$r_m$ is 3. See FIG. 11F.
$x_h$=1100=12
$x_l$=011=3
$x_{new}=x_h*r_m+x_l=12*3+3=39=100111$
Is $x_{new}<y$ (No)
Step 4: Iteration 3
Find $x_h$ and $x_l$ such that $x_{new}$ is as in FIG. 11G.
$x_h$=100=4
$x_l$=010=2
$r_l=x_l \% y=2 \% 5=2$
$x_{new}=x_h*r_m+r_l=4*3+2=14=1110$
Is $x_{new}<y$ (No)
Step 4 Delayed $r_1$: Iteration 3
Since $r_m$ is 3, and $x_h$ and $x_l$ are as in FIG. 11G:
$x_h$=100=4
$x_l$=111=7
$x_{new}=x_h*r_m+x_l=4*3+7=19=10011$
Is $x_{new}<y$ (No)
Step 5: Iteration 4
Find $x_h$ and $x_l$ such that $x_{new}$ is as in FIG. 11H.
$x_h$=1=3
$x_l$=110=6
$r_l=x_l \% y=6 \% 5=1$
$x_{new}=x_h*r_m+r_l=1*3+1=4=100$
Is $x_{new}<y$ (Yes)

Step 5 Delayed $r_l$: Iteration 4
Since $r_m$ is 3, and $x_h$ and $x_l$ are as in FIG. 11H,
$x_h$=10=2
$x_l$=011=3
$x_{new}=x_h*r_m+x_l=2*3+3=9=1001$
Is $x_{new}<y$ (No)
Step 6 Delayed $r_1$: One Extra Iteration
Since $r_m$ is 3, and $x_h$ and $x_l$ are as in FIG. 11H,
$x_h$=1=1
$x_l$=1=1
$x_{new}=x_h*r_m+x_l=1*3+1=4=100$
Is $x_{new}<y$ (Yes)
Stop

APPENDIX 2

Multiplication operations in the methods described above are expensive and can be made less computationally expensive by incorporating the Karatsuba algorithm, described for example in U.S. pre-grant patent publication US 2007/0083585 A1 (inventors: St Denis et al.), published Apr. 12, 2007, incorporated herein by reference.

Furthermore, the Comba method can be used to expedite multiplication operation. The Comba method is described, for example, in U.S. Pat. No. 7,650,374, issued Jan. 19, 2010 to Gura et al., incorporated herein by reference.

Example of Comba Computation

An example Comba computation for multiplying 23 by 89 is shown in FIG. 12.

With Coma method, we do column by column multiplication instead of row by row. In addition to the carry delay technique, fewer carries need to be computed, to obtain an optimal solution.

$$2^7=256=100000000$$

$$256-129=127$$

APPENDIX 3

Montgomery Reduction

Compute X mod Y
1. x=X
2. for k=1 to K do
3. if the $k^{th}$ bit is high then
4. x=x+2kY
5. return $x/2^K$

What is claimed is:
1. A method comprising:
performing a first modulus operation by a system having a processor whose instruction set includes an instruction subset having one or more addition instructions and one or more multiplication instructions, wherein each instruction in the subset accepts an operand of a first size greater than one bit;
wherein the first modulus operation has a dividend x and a divisor y;
wherein performing the first modulus operation comprises:
(1) obtaining, by the system, first components xi of the dividend x, each first component xi representing a sequence of consecutive bits of the dividend, each first component xi occupying, in a computer storage in the system, a number of bits which is divisible by the first size, the dividend being equal to a sum of first monomials such that each first monomial is a product of a corresponding first component and a corresponding power $M1^i$ of a value $M1=2^{\alpha 1}$ where $\alpha 1$ is an integer greater than one and is divisible by the first size, wherein in at least one corresponding power $M1^i$, an exponent i is positive;

(2) for a set of one or more first monomials whose exponents are positive, obtaining by the processor, for each first monomial $M1^i$ in the set, a modulus ($M1^i$ % y);

(3) for each first monomial, multiplying, by the processor, a corresponding first multiplicand by a corresponding second multiplicand to obtain a corresponding product, wherein:

the corresponding first multiplicand is either the corresponding first component xi or the modulus (xi % y);

the corresponding second multiplicand is either the corresponding power $M1^i$ or the modulus ($M1^i$ % y);

wherein for at least one first monomial, the corresponding second multiplicand is the modulus ($M1^i$ % y);

(4) obtaining, by the processor, a sum of the corresponding products; and (5) calculating the modulus (x % y) by the processor by using the sum of the corresponding products as a dividend instead of x.

2. The method of claim 1 wherein in operation (3), the corresponding products for at least two components are calculated in parallel by the processor.

3. The method of claim 1, wherein in operation (3), for a set of one or more first monomials, the corresponding first multiplicand is the modulus (xi % y);

wherein for each first monomial in said set of one or more first monomials:

the corresponding first component xi is a concatenation of corresponding second components xij, each second component xij representing a sequence of consecutive bits of the corresponding first component xi, each second component xij occupying, in a computer storage, a number of bits which is divisible by the first size, the corresponding first component being equal to a sum of second monomials such that each second monomial is a product of a corresponding second component and a corresponding power $M2^i$ of a value $M2=2^{\beta 1}$ where $\beta 1$ is an integer greater than one and is divisible by the first size, and $M1=M2^k$ where $k=\alpha 1/\beta 1$ is an integer greater than 1, and wherein in at least one corresponding power $M2^i$, an exponent i is positive;

in operation (5), calculating the modulus (xi % y) comprises performing operations (2), (3) and (4) with:

the dividend x being replaced by xi;

M1 being replaced by M2.

4. The method of claim 3, wherein for each first monomial in said set of one or more first monomials, a number of the corresponding second components is smaller than or equal to k.

5. The method of claim 3, further comprising:

storing, in a computer storage, pre-calculated remainders ($M1^i$ % y) and ($M2^j$ % y) for j from 1 to k−1 inclusive, and for i from 1 to a predefined value inclusive, but not for any j being greater than or equal to k except if ($M2^j$ % y)=($M1^i$ % y) for some i;

in at least one instance of operation (3), obtaining the second multiplicand as a pre-calculated value from the computer storage.

6. The method of claim 1, wherein in operation (1), said obtaining each first component comprises storing the first component in an addressable memory of the computer storage beginning at an address boundary providing a fastest possible execution of instructions of the instruction subset in obtaining the corresponding first multiplicand and performing the corresponding multiplying in operation (3).

7. The method of claim 1, wherein in operation (3), each second multiplicand is stored in an addressable memory at an address boundary providing a fastest possible execution of instructions of the instruction subset in performing the corresponding multiplying.

8. The method of claim 1, wherein said multiplying is performed by a Comba method or a Karatsuba method.

9. A method comprising:

performing a first modulus operation by a system having a processor whose instruction set includes an instruction subset having one or more addition instructions and one or more multiplication instructions, wherein each instruction in the subset accepts an operand of a first size greater than one bit;

wherein performing the first modulus operation comprises:

obtaining, by the processor, a dividend x for the first modulus operation, and a divisor y for the first modulus operation, each of the dividend x and the divisor y being represented in a memory by a number of bits divisible by the first size;

determining, by the processor, a value xtmp equal to one of:

$$xh*(M \% y)+xl$$

$$xh*(M \% y)+(xl \% y)$$

where:

xl is m least significant bits of x, where m is greater than the first size and is divisible by the first size, $M=2^m$, xh is all the bits of m other than xl;

calculating the modulus by the processor from the value xtmp, the modulus being calculated as a value xtmp % y.

10. The method of claim 9, wherein calculating the modulus from the value xtmp comprises repeating the method with the value xtmp instead of x.

11. The method of claim 9, wherein in performing the first modulus operation, at least one of the values x, y, xtmp, xh, xl, and M is stored in said memory beginning at an address boundary providing a fastest possible execution of instructions of the instruction subset in performing the first modulus operation.

12. The method of claim 9, wherein in performing the first modulus operation, each of the values x, y, xtmp, xh, xl, and M is stored in said memory beginning at an address boundary providing a fastest possible execution of instructions of the instruction subset in performing the first modulus operation.

13. The method of claim 9, wherein determining the value xtmp comprises performing multiplication xh*(M % y) by a Comba method or a Karatsuba method.

14. A method comprising:

performing a modulus operation by a system having a processor whose instruction set includes an instruction subset having one or more addition instructions and one or more multiplication instructions, wherein each instruction in the subset accepts an operand of a first size greater than one bit;

wherein performing the modulus operation comprises:
obtaining a dividend in a computer storage;
obtaining a divisor in the computer storage;
performing a process that obtains, from the dividend, a unit consisting of a plurality of consecutive bits of a first value congruent to the dividend modulo the divisor, the unit not including a number w of least significant bits of the first value, wherein w is divisible by the first size, and w is greater than a size of the divisor but the unit is otherwise independent of the size of the divisor in that the process provides the same unit for any divisor of a size less than w;
determining, by the processor, a weight value for the unit, the weight value being congruent to $2^w$ modulo the divisor and having a size smaller than w+1; and
combining, by the processor, the weight value with the unit to determine a remainder of division of the dividend by the divisor.

15. The method of claim 14 wherein said combining comprises:
multiplying the unit by the weight value to obtain a weighted value; and
using the weighted value to determine the remainder of division of the dividend by the divisor.

16. The method of claim 14 or 15, wherein the weight value is equal to a remainder of division of $2^w$ by the divisor.

17. The method of claim 14, wherein in performing the first modulus operation, at least one of the dividend, divisor, the unit, the first value, and the weight, is stored in an addressable memory beginning at an address boundary providing a fastest possible execution of instructions of the instruction subset in performing the first modulus operation.

18. The method of claim 14, wherein in performing the first modulus operation, each of the dividend, divisor, the unit, the first value, and the weight, is stored in an addressable memory beginning at an address boundary providing a fastest possible execution of instructions of the instruction subset in performing the first modulus operation.

19. The method of claim 14, wherein said multiplying is performed by a Comba method or a Karatsuba method.

20. A method for performing modulus operations for dividends x by a processor, the method comprising:
storing, in a computer memory, a remainder ($x_B$ % y) for each of one or more values $x_B$, wherein y is a divisor for each said modulus operation;
receiving dividends x by the processor;
for each dividend x, performing the corresponding one of said modulus operations, wherein performing each corresponding modulus operation comprises:
calculating, by the processor, a difference between the dividend x and a corresponding one of said one or more values $x_B$; and
calculating, by the processor, a result of the corresponding modulus operation from the corresponding remainder ($x_B$ % y) and said difference.

21. The method of claim 20, wherein calculating the result of the corresponding modulus operation comprises:
calculating, by the processor, a remainder of division of said difference by the divisor y; and
calculating, by the processor, a result of the corresponding modulus operation from the remainder ($x_B$ % y) and said remainder of division of said difference by the divisor y.

22. The method of claim 20, wherein in performing each said modulus operation, at least one of the corresponding dividend x, the divisor y, and the corresponding value $x_B$ is stored in the computer memory beginning at an address boundary providing a fastest possible execution of instructions of the instruction subset in performing the modulus operation.

23. The method of claim 20, wherein in performing each said modulus operation, each of the corresponding dividend x, the divisor y, and the corresponding value $x_B$ is stored in the computer memory beginning at an address boundary providing a fastest possible execution of instructions of the instruction subset in performing the modulus operation.

* * * * *